US008914235B1

(12) United States Patent
Wichrowska et al.

(10) Patent No.: US 8,914,235 B1
(45) Date of Patent: Dec. 16, 2014

(54) SYSTEM AND METHOD FOR DETECTING A USER LOCATION USING A LATEST AVAILABLE LOCATION

(75) Inventors: Olga Wichrowska, Palo Alto, CA (US); Aleksandr V. Kennberg, Waterloo (CA)

(73) Assignee: Google Inc., Mountain View, CA (US)

( * ) Notice: Subject to any disclaimer, the term of this patent is extended or adjusted under 35 U.S.C. 154(b) by 670 days.

(21) Appl. No.: 13/104,093

(22) Filed: May 10, 2011

(51) Int. Cl.
*G06F 19/00* (2011.01)

(52) U.S. Cl.
USPC ........... 701/483; 701/485; 701/494; 701/500; 701/517; 701/519; 701/521; 455/456.3; 340/989; 340/993

(58) Field of Classification Search
USPC ............. 455/456.3, 456.1, 456.2, 456.6, 404, 455/404.2; 701/467, 516, 483, 400, 517, 701/519, 521, 522, 527, 532, 537, 409, 408, 701/412, 468, 469, 484, 485, 491, 494, 495, 701/500, 513, 423, 533; 340/4.21, 995.14, 340/995.18
See application file for complete search history.

(56) References Cited

U.S. PATENT DOCUMENTS

| 7,738,884 | B2 * | 6/2010 | Cheung et al. | ............. 455/456.3 |
|---|---|---|---|---|
| 8,340,691 | B1 * | 12/2012 | Starenky et al. | ........... 455/456.3 |
| 8,369,837 | B2 * | 2/2013 | Huang et al. | ............... 455/412.2 |
| 8,370,062 | B1 * | 2/2013 | Starenky et al. | .............. 701/467 |
| 8,532,670 | B2 * | 9/2013 | Kim et al. | .................. 455/456.1 |
| 8,577,392 | B1 * | 11/2013 | Pai et al. | .................... 455/456.3 |
| 2006/0095348 | A1 | 5/2006 | Jones et al. | |
| 2008/0045233 | A1 | 2/2008 | FitzGerald | |
| 2009/0286549 | A1 * | 11/2009 | Canon et al. | .............. 455/456.1 |
| 2010/0120422 | A1 * | 5/2010 | Cheung et al. | ................ 455/434 |
| 2010/0255856 | A1 * | 10/2010 | Kansal et al. | ............. 455/456.1 |
| 2011/0077862 | A1 * | 3/2011 | Huang et al. | .................. 701/208 |

* cited by examiner

*Primary Examiner* — Ronnie Mancho
(74) *Attorney, Agent, or Firm* — Lerner, David, Littenberg, Krumholz & Mentlik, LLP

(57) ABSTRACT

A system and method for location detection is disclosed. The system and method may derive estimates of a user's location by interfacing with other sources of location data. In one aspect of the invention, a client device may determine the user's location by using locally configured location services. The client device may also query a remote server that contains recent geolocation data of the user. Both the local and remote estimates may be presented to a user. The user may also be allowed to select the location that most accurately represents the user's current location.

16 Claims, 7 Drawing Sheets

SYSTEM AND METHOD FOR DETECTING A USER LOCATION USING A LATEST AVAILABLE LOCATION

FIELD OF INVENTION

The present invention relates generally to location detection. More particularly, aspects of the invention relate to enhancing the accuracy of location detection by interacting with supplemental sources of location information.

BACKGROUND OF THE INVENTION

Various network-based applications allow users to view the current geographic locations of the users' friends or family, if both parties have given permission. Many client devices are configured to report geolocation information to a server. Geographic position components may be used to determine the geographic location and orientation of a device. For example, a client device may include a global positioning system ("GPS") receiver used to determine the device's current geolocation or latitude, longitude, and, in some examples, altitude coordinates. Thus, as the client device changes location the client device may use the position component to determine a "new" current location. In another example, the current location of the client device may be determined periodically, for example, after a pre-determined update period, such as every minute or several minutes, has passed.

If a device is not GPS enabled or has a defective GPS component, the device may be configured with a backup location mechanism. For example, the geographic location of a cell phone may be determined by identifying one or more cellular tower identifiers ("cellIDs") and requesting the location from a geolocation server based on the cellID. Alternatively, the geographic location of the client device may be determined by triangulating the signals and locations of several cellular towers.

A geographic location may also be determined based on identifying nearby WiFi networks and the respective signal strengths and using this information to request the geolocation information from a server based on this information. In another example, the geolocation information may be determined by comparing the user's public Internet IP address with known locations of other electronically neighboring servers and routers.

These fallback mechanisms, however, are not as accurate as GPS. The accuracy of the location is limited by the configuration of a client device.

BRIEF SUMMARY OF THE INVENTION

A location detection method is provided. The location detection method may comprise receiving a request from a remote computer for a current geolocation of a user device; obtaining a latest former geolocation of the user device from a first source of geolocation information, the latest former geolocation of the user device being determined with a first location detection service; obtaining the current geolocation of the user device, the current geolocation being determined with a second location detection service different from the first location detection service; and returning the latest former geolocation and the current geolocation to the remote computer in response to the request for the current geolocation of the user device.

In one alternative embodiment, the first location detection service may employ GPS.

In another embodiment, the first location detection service may determine geolocation information more accurately than the second location detection service.

In a further embodiment, the second location detection service may be a WiFi location detection service.

In yet a further embodiment, the first source of geolocation information may be a user location database containing the latest former geolocation of the user device determined with the first location detection service.

In one aspect of the invention, a processing system for detecting a location of a user device is provided. The system may comprise at least one processor, and memory for storing user location data. The memory may be electrically coupled to the at least one processor. The at least one processor may be configured to receive a request from a remote computer for a current geolocation of the user device; to obtain a latest former geolocation of the user device from a first source of geolocation information, the latest former geolocation of the user device being determined with a first location detection service; to obtain the current geolocation of the user device, the current geolocation being determined with a second location detection service different from the first location detection service; and to return the latest former geolocation of the user device and the current geolocation of the user device to the remote computer in response to the request for the current geolocation of the user device.

In a further aspect, a location detection method is provided that may comprise transmitting a request to a remote computer for a current geolocation of a user device; receiving a latest former geolocation of the user device from the remote computer, the latest former geolocation of the user device being determined with a first location detection service; determining an estimate of the current geolocation of the user device with at least one other location detection service different from the first location detection service; and calculating the current geolocation of the user device based on the latest former geolocation of the user device and the estimate of the current geolocation of the user.

In another embodiment, the first location detection service may employ GPS.

In one embodiment, the estimate of the current geolocation of the user device and the latest geolocation of the user device may be presented for display on an electronic display.

In a further embodiment, the at least one other location detection service may be a WiFi location detection service.

In yet a further embodiment, the remote computer obtains the latest former geolocation of the user device from a supplemental source of geolocation information, the supplemental source of geolocation information being a user location database containing the latest geolocation of the user device determined with the first location detection service.

In yet another aspect of the invention, a processing system for detecting a location of a user device is disclosed. The system may comprise at least one processor, and memory for storing user location data. The memory may be electrically coupled to the at least one processor, wherein the at least one processor is configured to transmit a request to a remote computer for a current geolocation of the user device; to receive a latest former geolocation of the user device from the remote computer, the latest former geolocation of the user device being determined with a first location detection service; to determine an estimate of the current geolocation of the user device with at least one other location detection service different from the first location detection service; and to calculate the current geolocation of the user device based on the latest former geolocation of the user device and the estimate of the current geolocation of the user.

DETAILED DESCRIPTION

Systems and methods are provided that derive estimates of a user's location by interfacing with other sources of location data. In one aspect of the invention, a client device may determine the user's location by using locally configured location services. The client device may also query a remote server that contains the most recent geolocation data of the user. Both the local and remote estimates may be presented for display to a user. The user may also be allowed to select the location that most accurately represents the user's location.

Figure 1A:
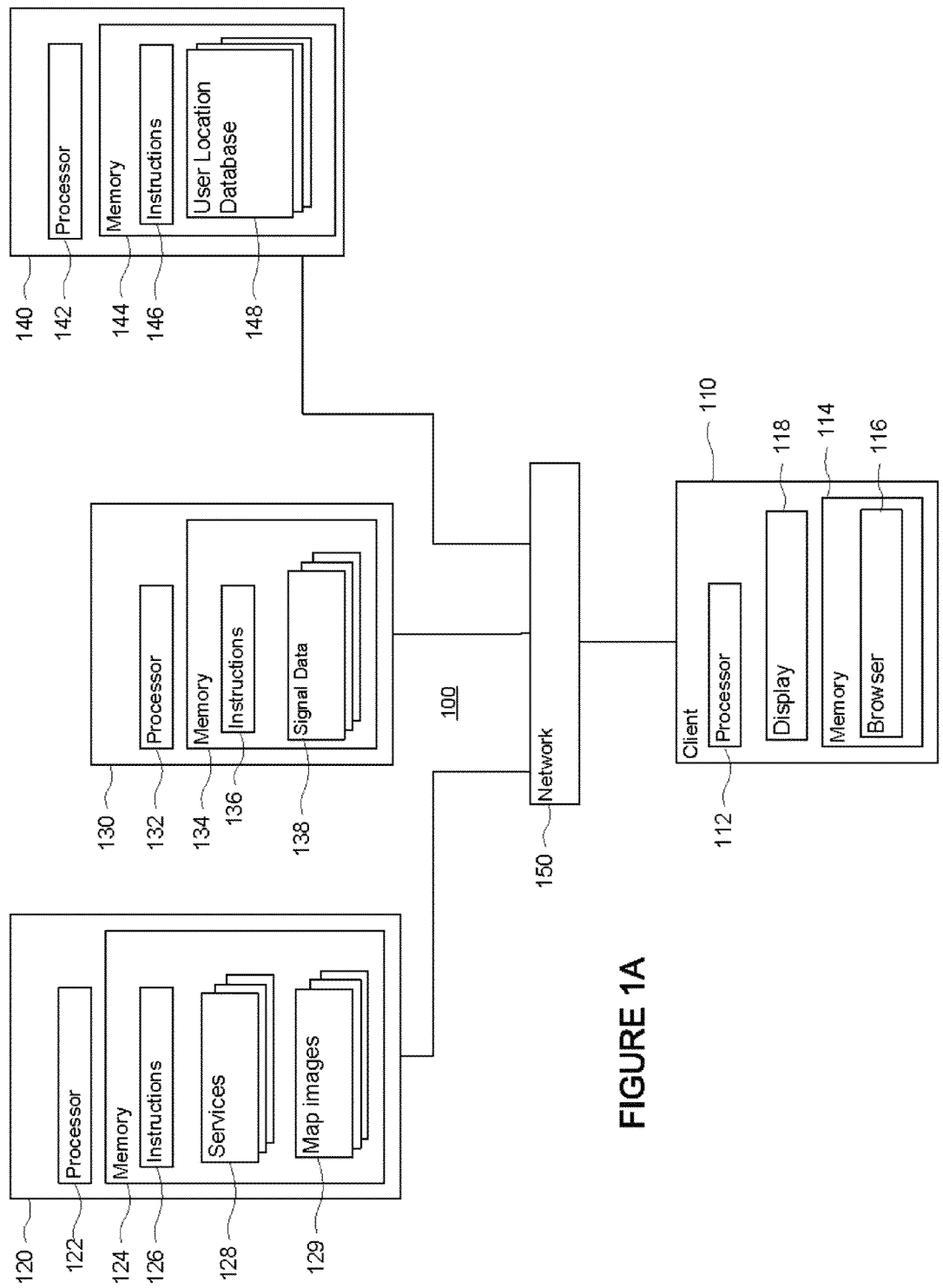
FIG. 1A illustrates a computer network architecture in accordance with aspects of the invention.

As shown in FIG. 1A, a system 100 in accordance with one aspect of the invention includes a client device 110, an application server 120, a server 130, and a location server 140, all of which are capable of communicating with each other over a network 150. Client device 110 may be configured to transmit initial requests for information to server 130. In turn, server 130 may be configured to serve the request by retrieving the requested information from application server 120, location server 140, or from local storage. It is understood that the client/server arrangement shown in FIG. 1A is only illustrative and that other arrangements may be utilized. For example, all the requested information may be contained within server 130. Alternatively, client device 110 may be configured to make initial requests to location server 140.

Figure 1B:
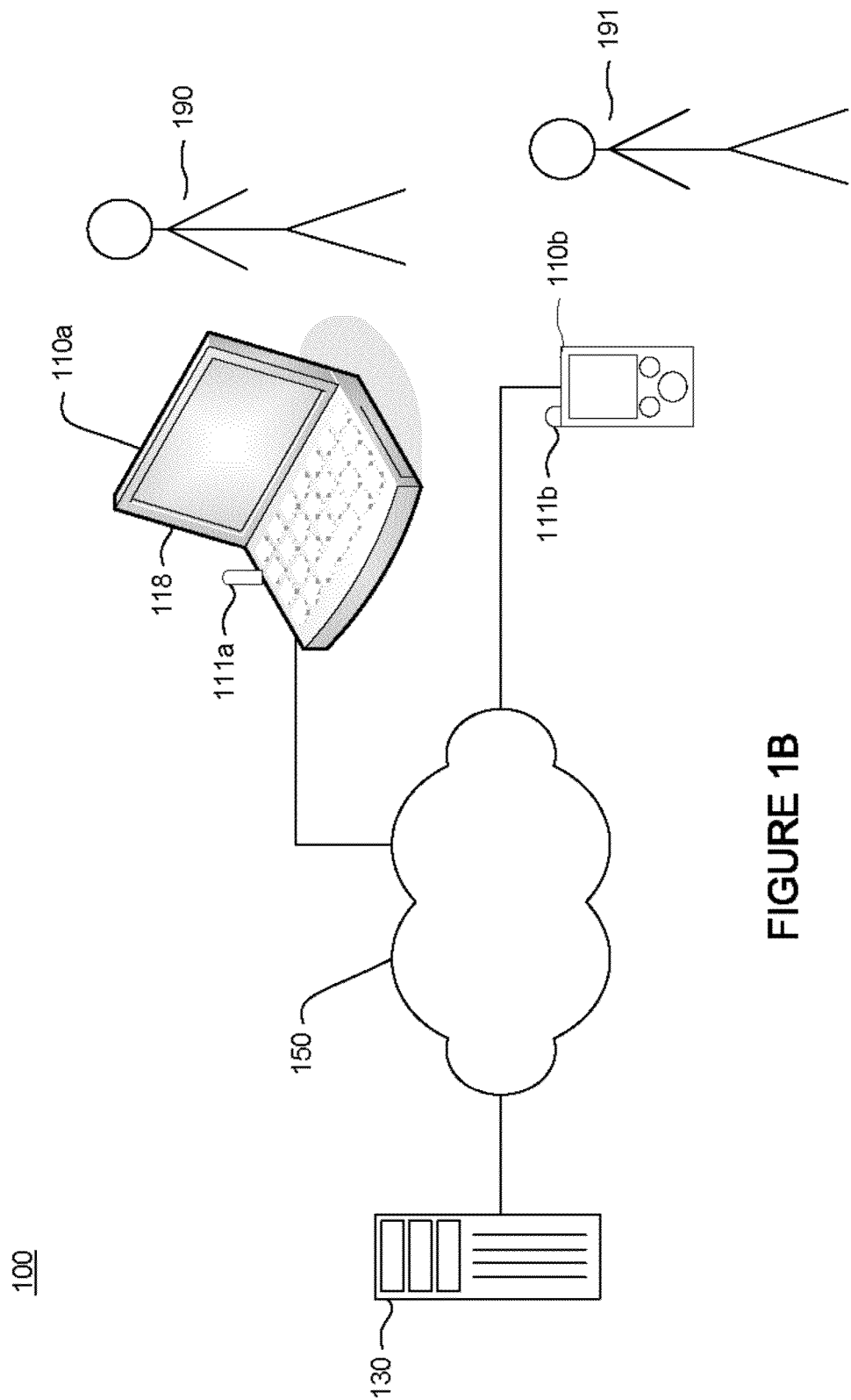
FIG. 1B is a pictorial diagram of the system of FIG. 1A.

The client device 110 may contain a processor 112, a memory 114, and a display 118. Client device 110 may be further configured with a browser 116 that may contain instructions executable by the processor 112. As shown in FIG. 1B, additional client devices may be configured similarly to client device 110. Client device 110 may be a laptop computer intended for use by a person 190, and have all of the components normally used in connection with a laptop computer such as display 118 (e.g., a monitor having a screen, a touch-screen, a projector, a television, a computer printer or any other electrical device that is operable to display information), and a user input (e.g., a mouse, keyboard, touch-screen or microphone).

Although the client device 110 may comprise a laptop or even a full-sized personal computer, it may alternatively comprise a mobile device capable of wirelessly exchanging data with a server over a network such as the Internet. As shown in FIG. 1B, client device 110b may be a wireless-enabled PDA for use by a user 191, a cellular phone, or a tablet PC capable of obtaining information via the Internet. The user input of client device 110b may be a small keyboard (in the case of a Blackberry-type phone), a keypad (in the case of a typical cellular phone) or a touch screen (in the case of a PDA), etc.

Application server 120 may contain a processor 122, memory 124 and instructions 126. Application server 120 may also contain map image data 129 that may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. Application server 120 may further contain services 128 that may be retrieved by server 130, served to client device 110, and presented to a user via browser 116. For example, services 128 may be a social networking service that allows pre-approved friends and family to locate each other throughout the day.

Server 130 may be configured similarly to the application server 120, with a processor 132, memory 134, and instructions 136. As noted above, server 130 may be configured as the first recipient of requests by client device 110. Server 130 may also contain signal database 138 that may be retrieved, stored, or modified by its processor 132 in accordance with the instructions 136.

As with server 130, location server 140 may also contain a processor 142, a memory 144, and instructions 146. Location server 140 may also contain user location database 148 that may be retrieved, stored, or modified by its processor 142 in accordance with the instructions 146. Although the architecture of user location database 148 and signal database 138 are not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The signal database 138 may include latitude/longitude locations of cell towers, Wifi routers etc. This information may be utilized by client device 110 to determine its location. The data of signal database 138 may be indexed by tower ID, in the case of a cell tower, or by MAC address, in the case of a WiFi router.

The user location database 148 may include location update information. This information may be received from a plurality of client devices. The location update information may be used to identify the location of a user (with the user's permission) for various applications, such as those which identify a user's location to pre-approved friends or family. The location information contained in user location database 148 may be transmitted to location server 140 by a client device utilizing WiFi access points, cell towers, or GPS. Alternatively, a user may even manually enter the location into the client device, which could also be transmitted to the location server 140. Preferably, privacy protections are provided for the user location database 148 including, for example, anonymization of personally identifiable information, aggregation of data, filtering of sensitive information, encryption, hashing or filtering of sensitive information to remove personal attributes, time limitations on storage of information, or limitations on data use or sharing. Preferably, data is anonymized and aggregated such that individual user data is not revealed.

The memories 114, 124, 134, and 144 may store information accessible by their respective processors including their respective instructions that may be executed by the processors. The memories may be of any type capable of storing information accessible by their respective processors including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 126, 136, and 146 may be any set of instructions to be executed directly (such as machine code) or indirectly (such as scripts) by their respective processors 122, 132, and 142. For example, the instructions may be stored as computer code on a computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Although FIG. 1A functionally illustrates the processors 122, 132, and 142 and memories 124, 134, and 144 as being within the same block, it will be understood by those of ordinary skill in the art that the processors and their respective memories may actually comprise multiple processors and memories that may or may not be stored within the same physical housing. For example, any one of the memories 124, 134, and 144 may be a hard drive or other storage media located in a server farm of a data center. Accordingly, references to a processor, computer, or memory will be understood to include references to a collection of processors or computers or memories that may or may not operate in parallel.

The client device 110 may be at one node of the network 150 and capable of directly and indirectly communicating with other nodes of the network. For example, server 130 may be capable of communicating with client device 110 via network 150 such that server 130 uses network 150 to transmit information for presentation to a user such as on display 118 of client device 110. Accordingly, server 130 may be used to generate requested information for display via browser 116 on client device 110. Any one of the servers 120, 130, and 140 may also comprise a plurality of computers, such as a load balancing network, that exchange information with different nodes of a network for the purpose of receiving, processing and transmitting data to multiple client devices. In this instance, the client devices will typically still be at different nodes of the network than any of the computers comprising each of the servers 120, 130, and 140.

Network 150 and intervening nodes may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIG. 1A, it should be appreciated that a typical system can include a large number of connected computers.

As illustrated in FIG. 1B, the client devices 110a,b may include respective antennas 111a and 111b which may be used to scan the WiFi spectrum and identify local WiFi signals. The antennas 111a,b may send information packets to a receiver which demodulates the data to determine various types of information. The information may include data regarding nearby WiFi network access points such as network SSIDs or Media Access Control ("MAC") addresses as well as the strength of the respective WiFi signals. The information collected may be limited to only that which is required to identify the WiFi network. For example, any payload data, containing for example, any personal information, information transmitted over a network and not intended as beacon messages, or information used for routing messages such as IP addresses, MAC addresses, etc. may be filtered or simply not collected during this process.

Figure 2:
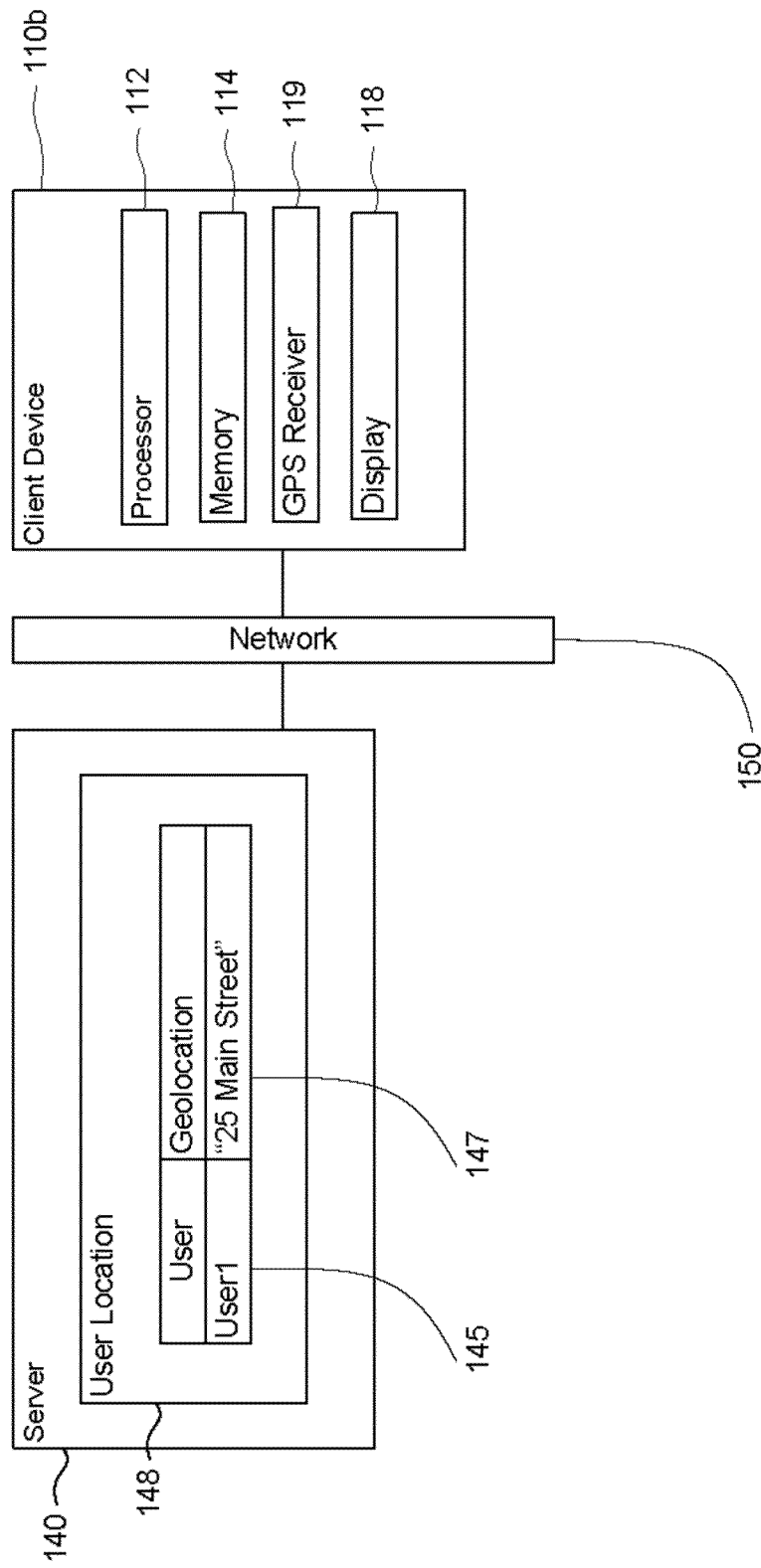
FIG. 2 is a functional diagram of data in accordance with an aspect of the invention.

As illustrated in FIG. 2, client device 110b may also include a GPS receiver 119 to determine the geographic location of the device. For example, client device 110b may use GPS receiver 119 to determine the device's latitude and longitude information, which may be transmitted to location server 140 and stored in user location database 148. Also shown in FIG. 2 are user identifier field 145 and geolocation field 147 contained within user location database 148. It will be understood that the fields shown are merely illustrative, and any variety of fields may be utilized in addition to or in the alternative to those shown. For example, another field indicative of the nearest tower for global systems and mobile communications may be added. A user may be carrying client device 110b while driving a car. As shown by the exemplary field values of fields 145 and 147 a user identified as "USER1" is carrying client device 110b and is currently located at "25 Main Street."

As will be discussed below, the addressed derived by the GPS service of client device 110b and stored in user location database 148 may be utilized by another client device. The second client device may employ a locally installed location mechanism (e.g., WiFi, IP, etc.) in conjunction with the user's latest available location, which may be a most recent former location, to determine the user's current location. Alternatively, in the event that GPS receiver 119 becomes unavailable, client device 110b may also utilize the latitude/longitude information stored in user location database 148 in conjunction with another local location mechanism.

Figure 3:
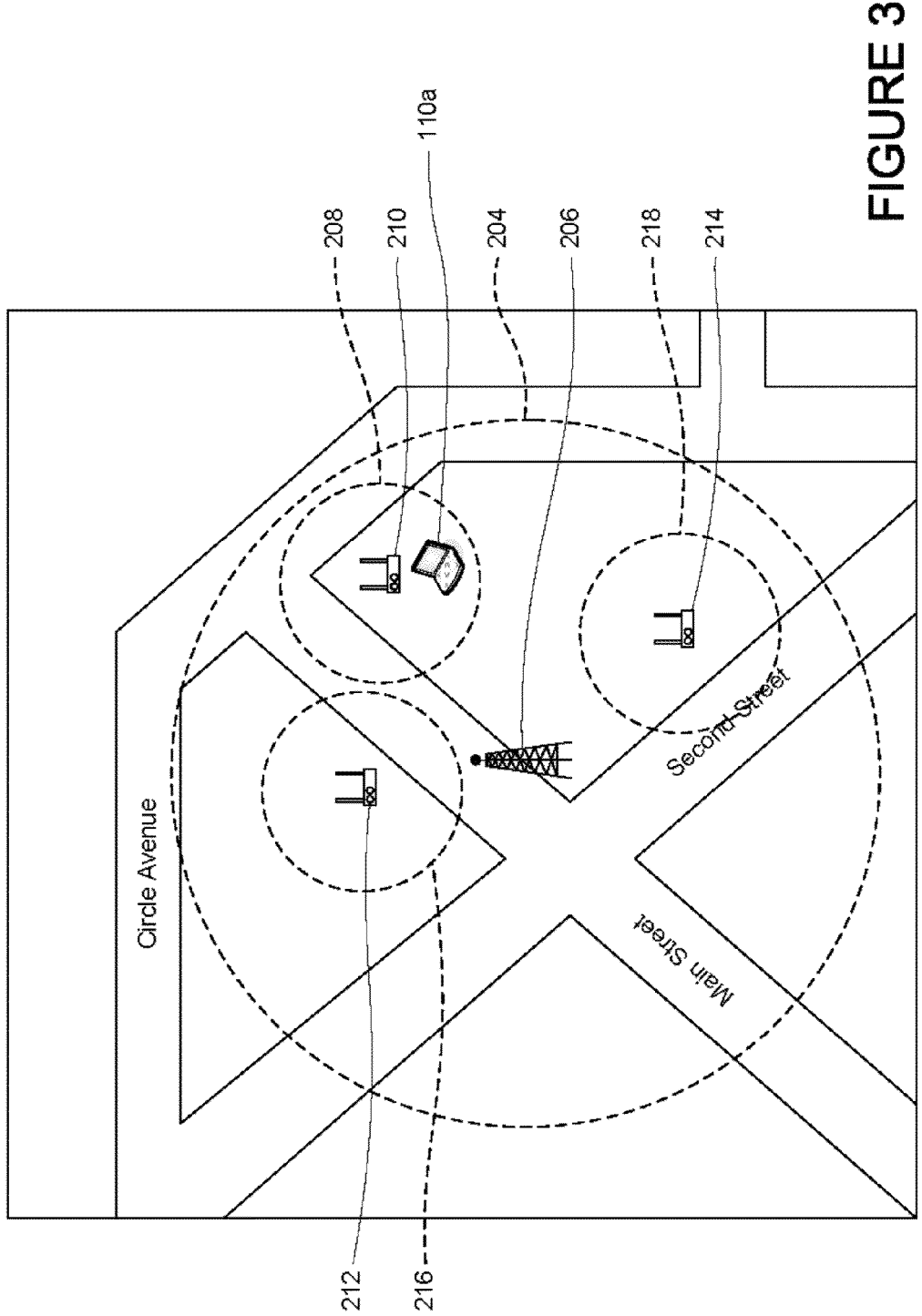
FIG. 3 is an example of potential geographic locations of wireless signals.

The user of client device 110b identified as "USER1" in the previous example may have exited the car and entered an establishment, such as a coffee shop or a pizzeria. Since GPS usually performs inadequately indoors, the user may switch to user device 110a, which may be equipped with a WiFi location mechanism. FIG. 3 shows a working example of client device 110a receiving wireless signals from a number of different sources. Client device 110a may be within range 204 of cell tower 206, or within range 208 of a wireless transmitter such as WiFi wireless router 210 or other wireless access point. While there may be other radio signals nearby, such as WiFi wireless routers 212 and 214, the client device may be out of their respective ranges 216 and 218.

Client device 110a may estimate its location locally based on the locations of the wireless signals detected by the device. Processor 112 of client device 110a may direct client device 110a to seek all proximate radio signals, e.g., cellular, WiFi and WiMAX signals.

Client device 110a may transmit the identities of the detected signals to server 130 accompanied by a request that the server provide information from which the client device may determine the detected signals' location. Client device 110a may transmit the detected signal identifiers to server 130, such as the ID of cell tower 206 or MAC address of WiFi wireless router 210.

Server 130 may use the signal information provided by client device 110a to determine the locations of the client-detected signals. In that regard, server 130 may query the signal database 138 with the received cell tower ID and MAC address to obtain the latitude/longitude location of cell tower 206 and WiFi wireless router 210.

In addition, server 130 may obtain the last available location or most recent former location of client device 110b from location server 140. Preferably, the location estimate provided by location server 140 is derived using a mechanism different than the mechanism available on client device 110*a*. Thus, in addition to the Wifi estimate shown above the latest available location stored in location server 140 may also be transmitted to client device 110*a*.

Processor 112 may then use the locations of the signals and the information provided by location server 140 to estimate its location. For example, the server may send the locations to the client device and the client device may estimate its own location based on the signal locations sent by the server and the latest available location provided by location server 140. The client device's estimated location may be determined in various ways in conjunction with the latest available location provided by location server 140. For example, the processor may average the device's latest available location with the signal's location. If the client device has received multiple signals at its current location, the different locations associated with the signals may be used in conjunction with the latest available location to estimate the device's location with more precision, such as looking for intersections within the estimates or calculating a centroid based on the various locations. The processor 112 may also consider the strength of the signal when determining the user's current location.

Figure 4:
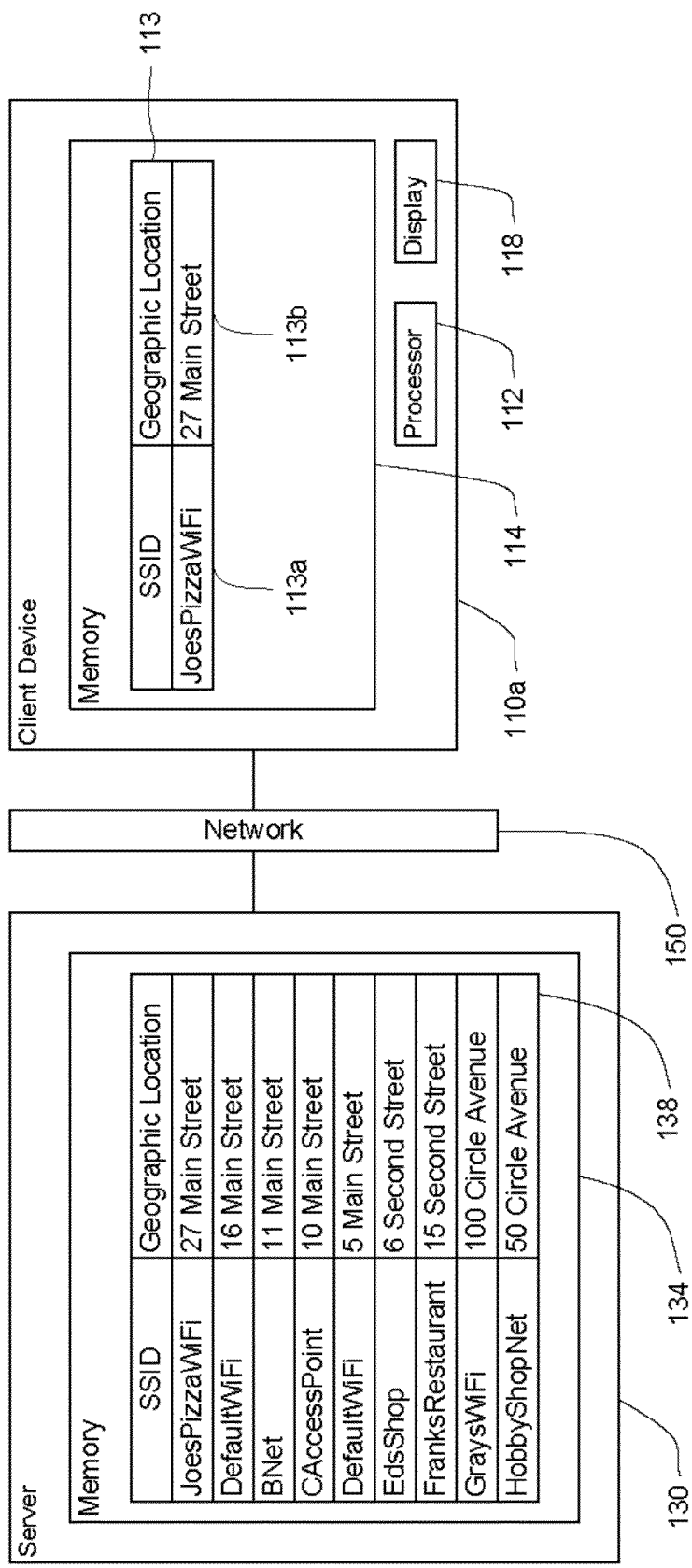
FIG. 4 is a further functional diagram of data in accordance with an aspect of the system and method.

FIG. 4 illustrates data that may be stored within the memory of both server 130 and client device 110*a*. In FIG. 4, it may be assumed that the user exited the car and entered a coffee shop located on "25 Main Street." The WiFi location mechanism of client device 110*a* may transmit a request for signal information to the server 130. The signal data 113 shown in FIG. 4 is representative of the illustrative WiFi wireless router 210 of FIG. 3. Field 113*a* may store the SSID of router 210 and field 113*b* may store the address of the router 210. FIG. 3 and FIG. 4 assume that the nearest SSID detected by client device 110*a* is the SSID ("JoesPizzaWifi") transmitted by WiFi wireless router 210. WiFi wireless router 210 may be located at "27 Main Street," which may neighbor the user's actual location at the coffee shop on "25 Main Street." Client device 110*a* may send the SSID to server 130, and receive the location of WiFi wireless router 210 (e.g., "27 Main Street") from server 130 in response. Server 130 may obtain this information from signal database 138.

Figure 5:
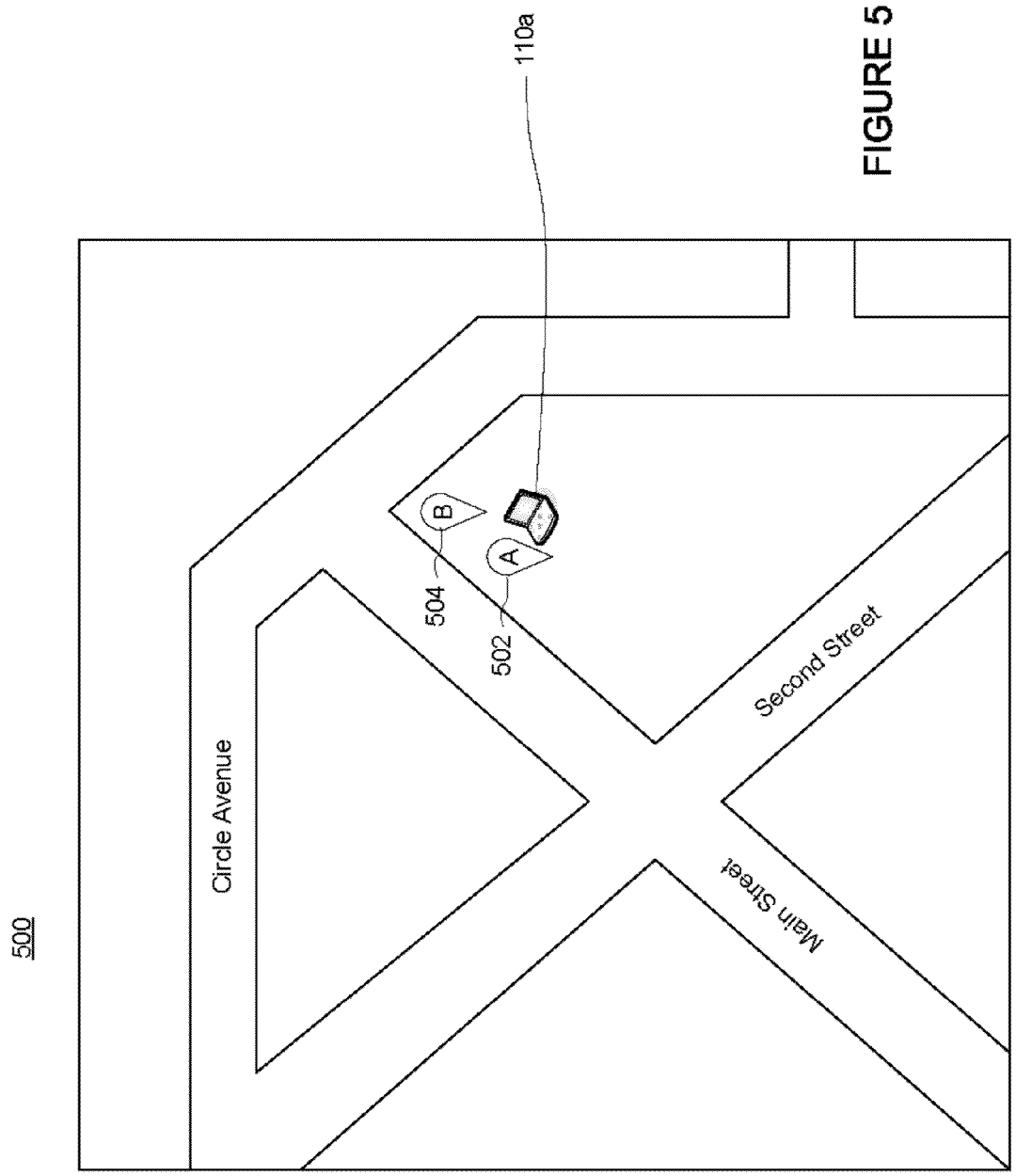
FIG. 5 is an exemplary screenshot in accordance with aspects of the invention.

In another embodiment, the different estimates may be presented to a user via display 118. FIG. 5 is an illustrative screen shot 500 showing the different estimated locations of a client device 110*a*. In the example of FIG. 5, map pin 502 represents the location retrieved from user location database 148 and map pin 504 represents the location derived locally on client device 110*a*. The screen may also display a menu that allows the user to select the choice that most accurately represents the current location. The client device may further display a map based on its estimated location.

In addition to the operations described above and illustrated in the figures, various operations in accordance with aspects of the invention will now be described. It should also be understood that the following operations do not have to be performed in the precise order described below. Rather, various steps can be handled in a different order or simultaneously, and steps may be omitted or added.

Figure 6:
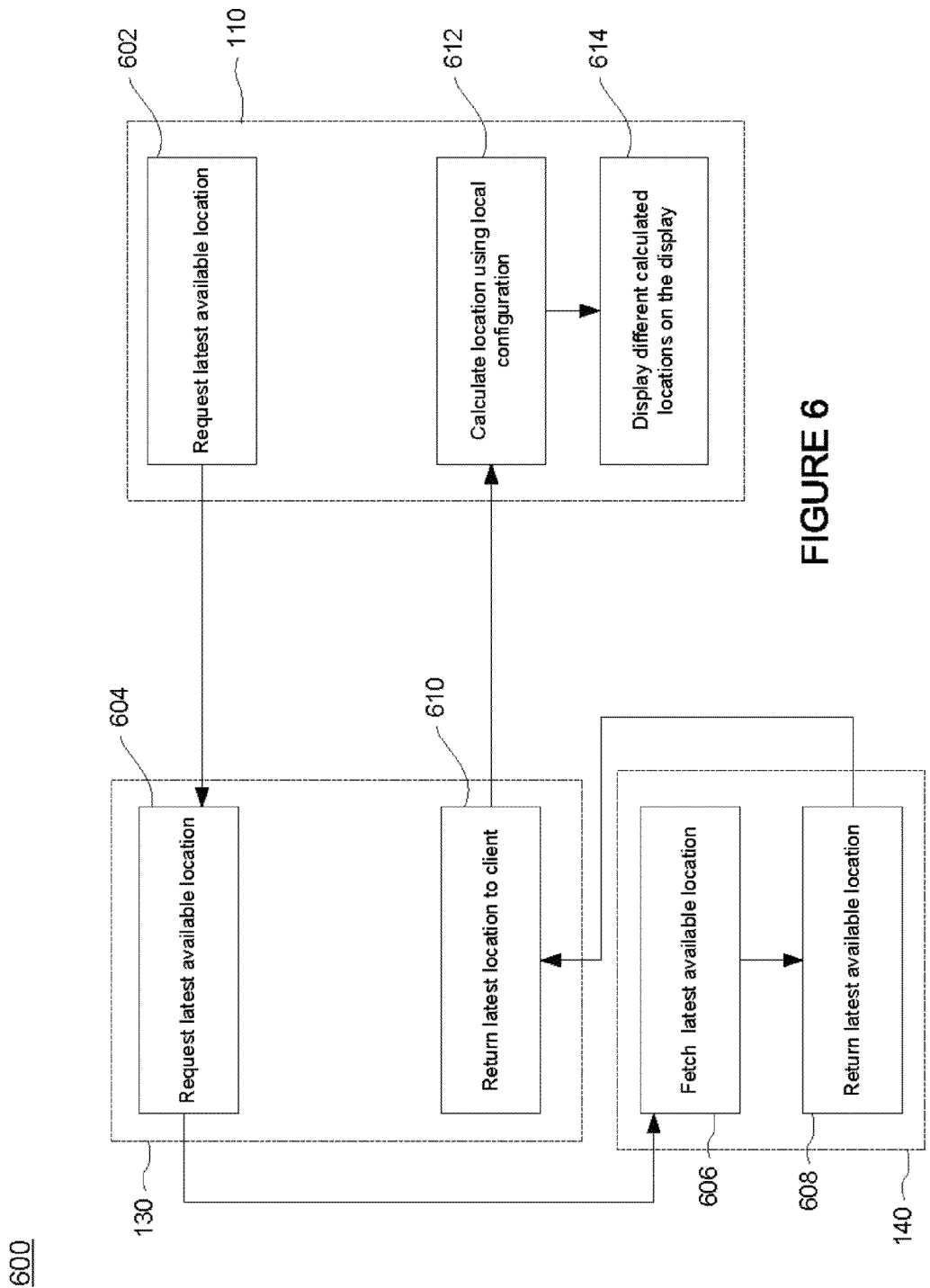
FIG. 6 is a flow diagram of an exemplary method for detecting a user's location in accordance with aspects of the invention.

Referring to FIG. 6, an exemplary embodiment of a method 600 is disclosed. As shown in block 602, client device 110 may make a request to server 130 for a user's latest available location. Server 130 may further request a user's latest available location from location server 140, as shown in block 604. As noted above, it will be understood that the user location database 148 may also be contained within server 130 and that the system shown in FIG. 1A is illustrative. In block 606, location server 140 may fetch the sought after latest location from user location database 148. The location detection service used to populate the user location database 148 is preferably different than those configured on client device 110. Thus, client device 110 may utilize user location database 148 as a supplemental source of location information. In block 608, the user's latest location may be returned to server 130. In turn, server 130 may return the user's latest location to client device 110, in block 610. In block 612, client device 110 determines a further estimate of the user's location using a locally configured location detection service (e.g., WiFi, IP, etc.). In block 614, client device 110 may present the different estimated locations to a user, e.g., on display 118. Alternatively, client device 110 or server 130 may determine a final estimate based on the estimates gathered in blocks 606 and 612.

One advantage of the above-described system and method is the ability to derive accurate location estimates of a user device despite the absence or unavailability of an accurate location detection service therein. In this regard, the accuracy of client device location estimates is enhanced. In turn, users may share their whereabouts with preapproved friends and family through social networking services or websites with a higher degree of certainty.

Although the invention herein has been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims. Furthermore, while particular processes are shown in a specific order in the appended drawings, such processes are not limited to any particular order unless such order is expressly set forth herein.

The invention claimed is:

1. A location detection method comprising:
    receiving, using one or more processors, a request for a current geolocation of a user device;
    obtaining, using the one or more processors, a previous geolocation of the user device from a first source of geolocation information, the previous geolocation of the user device being determined with a first type of location detection service;
    obtaining, using the one or more processors, an estimate of the current geolocation of the user device, the estimate of the current geolocation being determined with a second type of location detection service different from the first type of location detection service; and
    returning, using the one or more processors, the previous geolocation and the estimate of the current geolocation in response to the request for the current geolocation of the user device.

2. The location detection method of claim 1, wherein the first type of location detection service is a global positioning system.

3. The location detection method of claim 1, wherein the second type of location detection service is a WiFi location detection service.

4. The location detection method of claim 1, wherein the first source of geolocation information is a user location database containing the previous geolocation of the user device determined with the first type of location detection service.

5. A processing system for detecting a location of a user device, the system comprising:
    at least one processor; and
    memory for storing user location data, the memory electrically coupled to the at least one processor, wherein the at least one processor is configured to receive a request for a current geolocation of the user device, to obtain a previous geolocation of the user device from a first source of geolocation information, the previous geolocation of the user device being determined with a first type of location detection service, to obtain an estimate of the current geolocation of the user device, the estimate of the current geolocation being determined with a second type of location detection service different from the first type of location detection service, and to return the previous geolocation of the user device and the estimate of the current geolocation of the user device in response to the request for the current geolocation of the user device.

6. The system of claim 5, wherein the first type of location detection service is a global positioning system.

7. The system of claim 5, wherein the second type of location detection service is a WiFi location detection service.

8. The system of claim 5, wherein the first source of geolocation information is a user location database containing the previous geolocation of the user device determined with the first type of location detection service.

9. A location detection method comprising:
- transmitting, using one or more processors, a request for a current geolocation of a user device;
- receiving, using one or more processors, a previous geolocation of the user device, the previous geolocation of the user device being determined with a first type of location detection service;
- determining, using one or more processors, an estimate of the current geolocation of the user device with at least one other type of location detection service different from the first type of location detection service; and
- calculating, using one or more processors, the current geolocation of the user device based at least in part on the previous geolocation of the user device and the estimate of the current geolocation of the user device.

10. The location detection method of claim 9, wherein the first location detection service is a global positioning system.

11. The location detection method of claim 9, wherein the estimate of the current geolocation of the user device and the previous geolocation of the user device are rendered on an electronic display.

12. The location detection method of claim 9, wherein the at least one other location detection service is a WiFi location detection service.

13. A processing system for detecting a location of a user device, the system comprising:
- at least one processor; and
- memory for storing user location data, the memory electrically coupled to the at least one processor, wherein the at least one processor is configured to transmit a request for a current geolocation of the user device, to receive a previous geolocation of the user device, the previous geolocation of the user device being determined with a first type of location detection service, to determine an estimate of the current geolocation of the user device with at least one other type of location detection service different from the first type of location detection service, and to calculate the current geolocation of the user device based at least in part on the previous geolocation of the user device and the estimate of the current geolocation of the user device.

14. The processing system of claim 13, wherein the first location detection service is a global positioning system.

15. The processing system of claim 13, wherein the estimate of the current geolocation of the user device and the previous geolocation of the user device are rendered on an electronic display.

16. The processing system of claim 13, wherein the at least one other location detection service is a WiFi location detection service.

* * * * *